H. S. THOMPSON.
Clothes-Horse.
No. 213,078.    Patented Mar. 11, 1879.
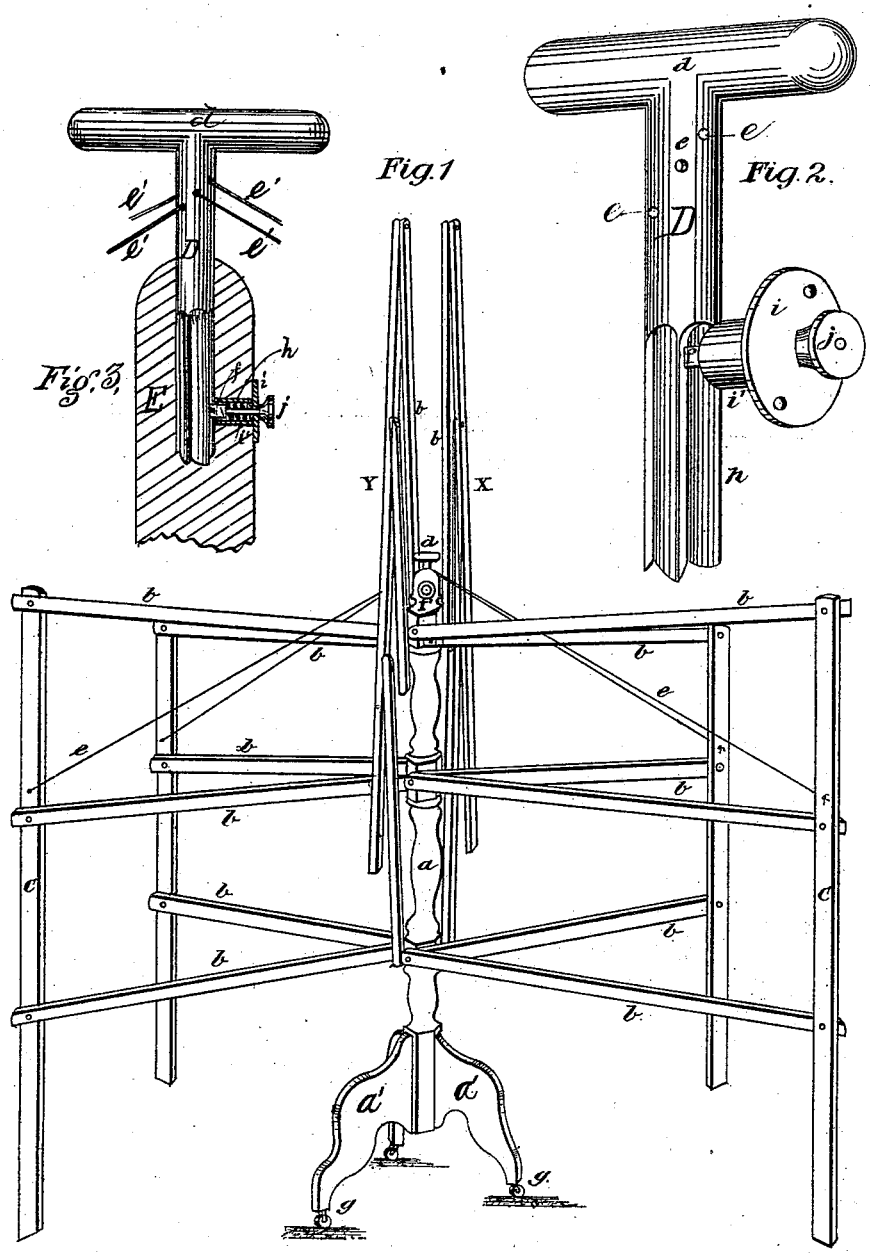

UNITED STATES PATENT OFFICE.

HARVEY S. THOMPSON, OF OAKDALE, PENNSYLVANIA.

IMPROVEMENT IN CLOTHES-HORSES.

Specification forming part of Letters Patent No. 213,078, dated March 11, 1879; application filed February 14, 1878.

*To all whom it may concern:*

Be it known that I, HARVEY S. THOMPSON, of Oakdale, in the county of Allegheny and State of Pennsylvania, have invented a new and useful Improvement in Clothes-Horses, which is fully described in the following specification and accompanying drawings.

My invention relates to that class of clothes-horses constructed with a central post, provided with projecting feet similar to those of a center-table, and having a series of radiating wings or sections, which are so pivoted to the center post that they can be folded up when the horse is not in use, as is shown in Fig. 1 of the drawings.

Figure 1 is a perspective view of a central post of the clothes-horse, provided with my improvement. Fig. 2 is a perspective view of my invention removed from the horse, and is of full size. Fig. 3 is a vertical cross-section of the upper part of the center post of a clothes-horse, the capstan part of the invention being shown in perspective, and the view of the indent-pawl in a vertical longitudinal section.

The object of my invention is, by means of a simple device, to raise the feet of the sections of a clothes-horse from off of the floor, and to hold them in that position, so that the horse can be moved from one place to another when desired, and when placed in the desired location the said feet can be easily and quickly dropped on the floor again.

The invention consists in the arrangement of a small capstan vertically in the top of the center post of a clothes-horse. The shaft of the capstan is made round, and surmounted with a cross-bar, by which said shaft is rotated on its axis in the post. The lower end of the capstan-shaft is longitudinally grooved out about two inches in length into a series of ratchet-teeth, into which mesh the point of an indent-pawl catch. That portion of the shaft which projects above the top is provided with a series of cords, which correspond in number to the wings or sections of the horse, to which they extend from said shaft, and fasten one to each section by about one-third of its entire length from its top, all of which is illustrated in detail in the drawings, to which reference is had.

$a$ is the center post of the clothes-horse, $a'$ being the supporting-feet, provided with the casters $g$. $b\ b$ are the horizontal arms. C is the leg of the section. D is the capstan, $d$ being the cross-bar. E is the top of the center post, in the top of which a hole is bored of such size and depth as will allow the capstan-shaft to enter about two-thirds of its length and freely turn or revolve therein. $p\ p$ are the ratchet-teeth, formed in the lower end of the shaft. $f$ is the indent-pawl, which is inclosed in the tube $i'$, which is provided with the flange $i$, having screw-holes for making it fast to the side of the post below the top. Said pawl extends longitudinally through said tube and flange, and terminates in a knob, $j$. $h$ is a spiral spring inclosed in the tube $i$, and coiled around the shaft of the pawl, and so attached and arranged as to force the point or head of the pawl out of the end of the tube. This spring-pawl device is inserted in a hole bored from the exterior of the post to its center at right angles to the hole or seat of the capstan-shaft, which it intersects at a point near the top of the ratchet, so that the point of the pawl will engage the teeth of the ratchet, as is shown in Fig. 3, to which reference is hereby had. $e\ e$ are holes drilled through the projecting part of the capstan-shaft, in which are made fast the cords $e'\ e'\ e'$, which extend to and fasten to the section-legs C, as shown in Fig. 1.

Operation: The sections being extended and the horse in use, (see Fig. 1,) and it being desired to move the horse from one place to another, the capstan is turned by the cross-bar, the pawl giving as the ratchet-teeth revolve. At the same time the cords $e\ e\ e$ are coiled around the shaft, and raise the legs C of the sections off the floor. The indent-pawl, by engaging the teeth of the ratchet, holds the legs so raised in such position by preventing the capstan from turning back. The entire horse is then rolled or wheeled on the casters $g\ g\ g$ to the desired position without the sections becoming deranged by reason of their feet dragging on the floor.

When the horse has arrived at the desired location, the pawl is withdrawn from its engagement with the ratchet, and the capstan turns back, releasing the cords, and the legs drop down and resume their bearing on the floor.

Having thus described my invention and its operation, what I claim, and desire Letters Patent for, is—

In a clothes-horse, the capstan D, as described, in combination with an indent-pawl and a series of cords, all arranged and operating as and for the object set forth.

HARVEY S. THOMPSON.

Witnesses:
 WM. M. CUTHBERT,
 ALBERT J. HARNACK.